Figure 1:
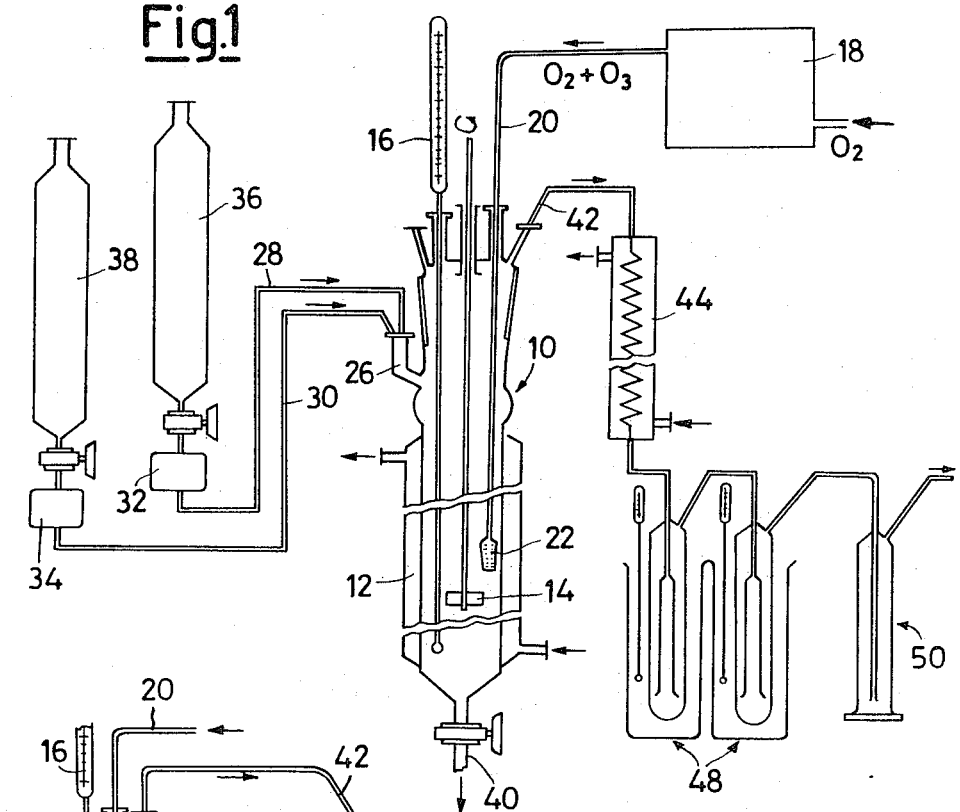

United States Patent [19]

Siclari et al.

[11] 3,868,392

[45] Feb. 25, 1975

[54] METHOD AND APPARATUS FOR THE PRODUCTION OF PEROXIDE DERIVATIVES OF HIGH PURITY OZONIDES, BY OZONIZATION OF THE CORRESPONDING OLEFINS, AND SUBSEQUENT TREATMENTS

[75] Inventors: Francesco Siclari, Barlassina; Pietro Paolo Rossi, Garlasco, both of Italy

[73] Assignee: Snia Viscosa Societa Nazionale Industria Applicazioni Viscosa S.p.A., Milan, Italy

[22] Filed: Feb. 17, 1972

[21] Appl. No.: 227,203

[30] Foreign Application Priority Data
Feb. 19, 1971 Italy .................................. 20802/71

[52] U.S. Cl............... 260/340.3, 260/338, 260/339, 260/526 N, 260/526 R, 260/537 R
[51] Int. Cl........................................... C07c 75/00
[58] Field of Search............ 260/339, 526 R, 526 N, 260/537 R, 338

[56] References Cited
UNITED STATES PATENTS
3,481,954   12/1969   Franz .............................. 260/340.3

OTHER PUBLICATIONS

Bailey, P.S. "Ozonolysis of Organic Compounds," 1957, pp. 926–46.

Primary Examiner—John D. Randolph
Assistant Examiner—Mildred A. Crowder
Attorney, Agent, or Firm—Shlesinger, Fitzsimmons & Shlesinger

[57] ABSTRACT

A method is disclosed for the production of peroxide-like derivatives of ozonides by ozonization of the correspoding olefins, comprising the step of placing an olefin in the presence of ozone in solution in a solvent mixture which comprises at least a nonpolar solvent (inert with respect to the olefin concerned) and at least a polar solvent, in which the as formed ozonide is reactively dissolved, a heavy weight phase being formed which contains the peroxide-like derivative. The derivative in question is removed from the reaction environment so as to substract it from superoxidation and polymerization effects.

13 Claims, 2 Drawing Figures

METHOD AND APPARATUS FOR THE PRODUCTION OF PEROXIDE DERIVATIVES OF HIGH PURITY OZONIDES, BY OZONIZATION OF THE CORRESPONDING OLEFINS, AND SUBSEQUENT TREATMENTS

This invention relates in general to the production of peroxide derivatives of readily separable, high parity ozonides by ozonization, in the liquid phase, of the corresponding olefins.

The technology of the ozonolysis (ozonization) of olefins, more particularly of cyclo-olefins, is known in the appertaining art, especially in the experimental and laboratory arts. According to the literature, the ozonolysis run proceeds according to the following pattern:

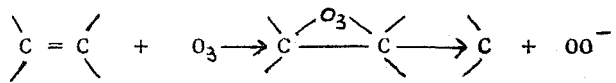 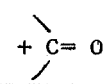

The attack of ozone on the double bond of an olefin forms a primary ozonide which is presumably split to give a zwitterion and a carbonyl compound. The peroxide-like products, which are originated by the fact that ozone can be summed to carbon-carbon double bonds, can be demolished with formation of oxygenated products both by reduction with hydrogen and catalysts, and with other reducing agents, and obtaining with more or less high yields, either aldehydic or ketonic functions, and also by decomposition by heat, thus obtaining mixtures of substances having aldehydic or ketonic functions, substances having acidic functions and by-products.

It is also known, and this is matter of laboratory experiments, that in the ozonolysis mechanism according to the pattern reported above, there are quite different developments when the ozonolysis run is carried out, in a liquid phase, in the presence of reactive, or polar, solvents, or in the presence of non-reactive solvents, or non-polar, and more particularly when the ozonolysis is carried out by introducing into the liquid phase ozone-laden air or ozone-laden oxygen, that is, a mixtrue of $O_2$ and $O_3$. Briefly the results of well known laboratory tests, these different developments can be summarized as follows:

By operating in the presence of a reactive solvent, such as alcohols or carboxylic acids, it is presumed that the zwitter-ion is reactively dissolved to form a hydroperoxyde of the type:

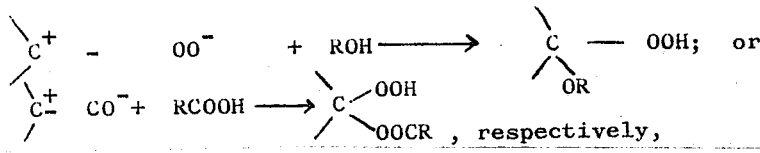 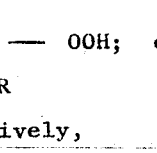

whereas, when operating in a non-polar environment which is non reactive, peroxides having a polymeric nature are obtained, which polymerize immediately as they are formed, in the same environment of the reaction, thus forming dimers or even polymers having a higher degree of condensation.

Although a few industrial applications of the ozonolysis processes have been suggested, for example for the formation, inter alia, of omega-alpha alkanoic acids and omega formyl alkanoic acids, it is not within the applicants' knowledge that such methods may have had a concrete and actual industrial development, more particularly in the extremely important field of the production of the acidic aldehydes. The Applicant is thus of opinion that the lack of the concrete development of these methods to the end of profitable industrial applications, lies principally in the fact that neither of the two ozonolysis methods, in the liquid phase and in nonreactive or reactive solvents, respectively, can be conducive to ozonides which, through subsequent treatments, are susceptible, in turn, of originating the obtention of the desired compounds with adequate yields and high purity.

As a matter of fact, by operating in a nonpolar environment, one obtains, in practice, a peroxide having a markedly polymeric nature which cannot be utilized subsequently. By operating in a nonreactive environment, the product of the ozonization, as exposed to the oxidising action of the mixture $O_2$-$O_3$, leads to the formation of a complex mixture of compounds, a mixture whose composition is a function of the temperature and the duration of the ozonization process, the nature of the reactants, and others, while the expected compounds, whwich make up a small fraction of these mixtures, cannot be separated, or can be separated only with great difficulty from the other products thus obtained, and so forth.

Having the foregoing considerations in mind, it is an object of the present invention, to provide a method for the production of peroxide derivatives of ozonides, which are adapted to be converted into functional compounds, more particularly bifunctional, preferably but not exclusively aldehydic acids, said method consisting in the ozonization of olefins, particularly cycloolefins under such conditions as to lead to the obtainment of readily separable ozonide, derivatives in an unpredictably pure form, form the reaction mixture.

It is a further object of the invention to provide a method as outlined above, which permits attaining very high yields and selectivity in the production of said ozonide derivatives.

It is another object of the invention to provide a method of the kind referred to above, for the ozonization and obtention of ozonide derivatives under a form which is particularly suitable for their subsequent selective transposition, with high and very high yields, into the expected compound, such as an acidic aldehyde.

An additional object of the present invention is to provide a method comprising the performance of the above enumerated stages and treatments under conditions which can be particularly well applied in the industrial field, more particularly in continuous processes and under thermal and environmental conditions which are in no way burdensome. Yet another object of the invention is to provide and to employ particular apparatus, such as defined hereinafter, for carrying out said ozonization, obtention and separation of the ozonide derivatives, under the aforementioned favourable conditions for their subsequent transposition.

Essentially, and in the broadest possible terms, the method according to the invention is characterized by a method of ozonization of olefine compounds, according to which the peroxidic ozonide derivative, as formed, is immediately removed from the contact with the $O_2$–$O_3$ mixture which is present, so as to prevent superoxidation, and to prevent the molecules of said derivative from reacting with each other so as to lead to the formation of a polymeric peroxide, said thusly formed and conserved derivative being moreover in a state which can be readily isolated and removed from the reaction environment.

This important improvement over the conventional ozonolysis procedures, and the consequent industrial results, as made possible by the method outlined above, is characterized more particularly in that the ozonization process is primed by placing ozone, more particularly ozone-laden air or ozone-laden oxygen, in the presence of the olefin in solution in a mixture of two or more solvents, both polar and nonpolar, and under such conditions that the ozonide molecules, thus formed, will form, in turn, with the polar solvents a peroxide derivative which is insoluble in the nonpolar fraction of the medium and can be separated from the remainder of the solution and thus both the above mentioned process trend towards superoxidation and the aforementioned process trend towards polymerization are hindered.

According to an advantageous feature of the invention, ozonization is carried out, in the liquid phase, in a mixture of solvents, at least one of which is polar, and at least another of which is non polar, said solvents being at least partially miscible with one another and exhibit a marked difference between their specific gravities and said insoluble derivative (the nonpolar solvent(s) having preferably the lesser specific gravity), so as to ensure the separation, also in the form of precipitation, of the reacted fraction. Meanwhile the ozone, and more particularly the ozone-laden oxygen is introduced in the liquid phase above the level or fraction of said liquid phase beneath which the precipitate is to be collected. Mechanical actions, such as centrifuging, can be used to obtain such a separation.

Although the mechanism of the method of this invention has not been elucidated with certainty, it can be surmised that the ozonization phenomenon, as it occurs under conditions which inhibit the superoxidation of the as formed ozonide derivative, the latter, is impeded, in turn, from dimerizing and also polymerizing, due to the fact that its molecules are protected by the polar solvent: this solvent, due to its stronger affinity with the ozonide, has a solvating action, or an equivalent thereof.

The method which is characteristic of this invention can be carried out with advantage by employing, as the vehicle for intorducing ozone, either oxygen or air, even weakly ozone-laden, for example even in a range of 0.3 grams of ozone per 100 liters of air (under atmospherical pressures) and preferably 4 grams and not necessarily more than 15 grams of ozone per 100 liters of air.

The mixture of the polar and nonpolar solvents can comprise, with advantage, as a reactive, or polar solvent, low molecular weight alcohols, formic acid, propionic acid, and, preferably, acetic acid, and, as a nonreactive or nonpolar solvent, petroleum ether, n-hexane, n-heptane, cyclohexane, methyl-cylcohexane and others. The mixture is, preferably and with advantage, prepared by matching polar and nonpolar solvents which are adapted to afford a specific gravity differential capable of encouraging said ready separation and precipitation of the as-formed ozonide derivative. Possibly, a mechanical action, such as centrifuging, can be imparted to the reaction medium, in the case in which the specific gravity differential of the solvents is inadequate to afford the desirable sharp separation of the environment into two fractions, one intended for ozonization and the other for separation and removal of the ozonide derivatives, respectively.

Said mixture can be made up by two solvents, one of which is polar and the other nonpolar, or, as an alternative, by more than two solvents, a part of which is polar and the other is nonpolar.

For example, the liquid phase can consist, with advantage, of a combination of petroleum ether with propionic acid, of cyclohexane with acetic acid (or formic acid), or of acetic acid with n-heptane, the mixtures of acetic acid with cyclohexane and with n-heptane being preferable.

One could also use cyclohexane — acetic acid — acetic anhydride mixtures, or cyclohexane—propionic acid — propionic anhydride, or also n-heptane with the above cited combinations of an acid and an anhydride. As an alternative, both the acids and the alcohols may also contain water. These mixtures often insure a quicker and sharper separation of the solution of the ozonide derivative in the reactive solvent or solvent mixtures, from the reaction medium.

Figure 2:
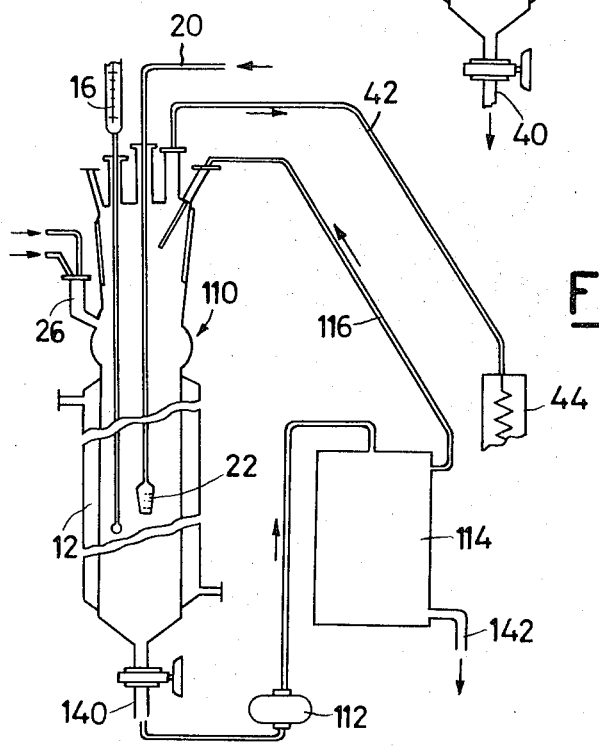

It is apparent that the mixture of the solvents should be proportionally sufficient for the complete dissolution of the olefin. Preferably, the amount of the nonpolar solvent alone should be sufficient, as itself, to ensure said dissolution. The polar solvent, in turn, should be in an amount which is sufficient to ensure the dissolution of the obtained ozonide derivative, which is present at every instant in the reaction environment, in order to inhibit the tendency towards polymerization as outlined above. Lastly, the ratio between the polar and the nonpolar solvent should be properly selected so as to ensure the desirable ready separation of the obtained ozonide, which selectively associates itself to the polar solvent, in which it is reactively dissolved. In practice, ratios of the polar solvent to the nonpolar one, by weight, ranging between 1 to 100 and 50 to 50 are suitable, preferably between 1 to 5 and 1 to 20. The invention can obviously be carried out in a number of embodiments, as will be indicated in the examples to follow. The ensuing examples have been carried out with the aid of apparatus of the kind to be described hereinafter with reference to the accompanying drawings, wherein:

FIG. 1 is a diagrammatical showing of a first embodiment of the apparatus used, by operating under conditions which exploit a sharp specific gravity differential between the two or more solvents which conjointly make up, according to the characteristic feature of invention pointed out above, the reaction environment in the liquid phase, and FIG. 2 is a fragmentary showing of a similar apparatus as modified by applying thereto means adapted to permit operation also in case such a specific gravity differential is inadequate to afford the desired ready separation of the ozonide as produced in the reaction environment.

In the exemplary embodiment shown in FIG. 1, the apparatus essentially comprises a reactor 10, of the vertical type, having a jacket 12 adapted for the circulation of a coolant fluid therethrough, such as cooled water, a stirrer 14, a thermometer 16 and, at any rate, the usual servicing and control means. The apparatus comprises an ozone generator 18, whose inlet is fed with oxygen ($O_2$) or possibly air, and which is adapted to supply an ozone-laden gas mixture ($O_2+O_3$) to a duct 20 which opens into a distributor 22 for feeding the mixture to the interior of the reactor 10, at a certain distance from the bottom thereof.

At a side inlet 26 of the reactor 10 open the ducts 28 and 30 which come, through metering devices 32 and 34, respectively, from reservoirs, or other means, 36 and 38, respectively, for supplying at least two types of solvents, and, more particularly, at least a polar solvent, and at least a nonpolar solvent.

The reactor is completed by a bottom outlet 40, equipped with appropriate means for the metered withdrawal of the heavy phase of the reaction product, whose lighter phase is discharged at the top, through a duct 42. The latter duct leads to an appropriate condenser 44, for example of the coil type, in which the outgoing oxygen stream, which entrains a portion of the solvents, undergoes an initial cooling, for example to 8°C, to be subsequently sent to "traps" 48 which are energetically cooled (for example to minus 70°C) with acetone and dry ice (solidified $CO_2$) to condense the solvent vapours emerging from the reactor. The contents of these traps is dumped at regular intervals, whereas the oxygen which escapes therefrom is caused to pass through an ancilliary apparatus 50 containing a neutral solution of potassium iodide for checking, according to a method which is technically conventional, the residual unreacted ozone.

The alternative embodiment as shown in FIG. 2, differs from the apparatus described above in that the relative reactor 110, in this case deprived of the stirrer, is connected, at its lower outlet 140, to a pump 112 which sends the reaction product into a centrifuging device 114 through the lower outlet whereof 142, the heavier phase is dumped, whereas the lighter phases are recycled, through a conduit 116, to the reactor top, at a level below that at which the reaction gas is drawn, through the duct 42, to be forwarded to the cooling and treating means as described above with reference to FIG. 1.

Specific examples of modes of carrying out the invention will follow, relating to said ozonization stage (with the apparatus as described above).

EXAMPLE I

Ozonization of Cyclododecene in Cyclohexane and Acetic Acid

An apparatus of the kind described with reference to FIG. 1 has been used, which was equipped with a reactor 10 having a volume of 800 mls. (effective) which was maintained at an internal temperature of about 9°C. The reactor was initially charged with 73 grs. of cyclododecene (96% purity) in a mixture composed by 557 grs. of cyclohexane and 70 grs. glacial acetic acid (ratio of polar to nonpolar solvent 1 to 8 approx.). The reactor has been initially fed, through the duct 20, with ozone-containing oxygen, as generated at 18, at the rate of flow of 60 liters an hour of the mixture $O_2+O_3$, the rate of flow of the ozone being 3.8 grams an hour. The rate of flow has been kept constant.

After a time of about 5 minutes, it was observed that the solution became turbid and that a heavy phase began to precipitate dropwise towards the reactor bottom said phase consisting of an ozonide, prevailingly dissolved in the polar solvent (acetic acid), with which it appears to have reacted and thus being in a form, or state, which can be not quite improperly defined as an "acetylated ozonide".

Obviously, the formation of such a heavy phase involves a removal of acetic acid and cyclododecene from the ozonization environment, this term being intended to identify the portion of the reactor's inner space which is above the level of the means 22 for introducing the ozone-laden gaseous phase, that is, the portion through which said gas stream is caused to flow and in which the olefin in solution can be contacted by the ozone. To allow for this removal and maintain the initial ratio of the reactants substantially constant, the necessary amounts of the reactants begin to be fed to the reactor. By trial and error the rate of flow which is required to ensure sure a compensation is found out, and it was 35 grs. an hour of acetic acid, and 17.35 grams an hour of cyclododecene.

Obviously; also the nonpolar solvent (cyclohexane) is physically present in small values in the precipitated heavy phase aforementioned, even though it plays no role in the reaction, and can thus be removed along with the heavy phase. Thus, periodically and continuously, the level of the liquid mass is brought back, or maintained, to its initial value, by additions of cyclohexane.

Once an adequate amount, or "head" of heavy phase has been built up on the reactor bottom (after about one hour as from the start of the operations) the phase is withdrawn continuously through the outlet 40, in an amount which is sufficient to maintain said head. By virtue of the introduction of the ozone-laden oxygen and the resistance opposed to the discharge of the reaction gases through the duct 42 and subsequent apparatus, the pressure within the reactor was stabilized around values in the order of 860 mms. of mercury (abs.pressure).

The traps 48, kept at minus 70°C, collect all the substances entrained in a gaseous state with the outgoing oxygen, and these are predominantly cyclohexane. In a check-up treatment, at 50, with a 5% solution of potassium iodide, the presence of negligible quantities of unreacted ozone in the exhaust gas was ascertained. After 15 hours of continuous run, the quantities of the fed-in compounds and of the heavy phase withdrawn from the reactor were checked, the following values having been measured:

| | |
|---|---|
| Fed-in cyclododecene | 260 grams |
| Fed-in ozone | 56.88 grams |
| Fed-in acetic acid | 524 grams |

The heavy phase, that is, the acetic solution of acetylated ozonide (containing small values of unreacted cyclododecene and cyclohexane) was, in turn, 898.3 grams during the same period of time. Such a heavy phase was treated with cyclohexane in order to strip it from the small amount of cyclododecene included therein (2%), then concentrated in a vacuo (20 mms.Hg), so that 528 grams of concentrated ozonide were finally obtained. Titration of active oxygen was performed according to the known G. Lohaus' method, and the value of 3.44% was obtained.

By conventionally calculating the reaction yields one obtains, on the basis of the fed-in active oxygen, in terms of ozone:

$$(56.88 \times 33.3)/100 = 18.9 \text{ grams}$$

with respect to the active oxygen as contained in the ozonide:

$$(528 \times 3.44)/100 = 18.2 \text{ grams}$$

so that the yield, with respect to ozone, was:

$$(18.2/18.9) \times 100 = 96.4\%$$

By conventional analytical methods, the regularity and the structural identity of the acetylated ozonide as obtained were checked, as a function of its ability to be converted into products of high purity, as follows. 16.20 grams of an acetic solution of the ozonide (46%) were added to a suspension of zinc dust, in a mixture of acetic acid, alcohol and water, at minus 5°C. Upon heating to 30°C during one hour, evaporation and extraction with ether, one obtains 6.85 grams of dodecanediol-1:12 having a 98.3% purity, as checked on the contents of aldehyde functions, with a boiling point of 125°–127°C under 2 mms. of mercury, and disemicarbazone at 201°C, that is very close to the value (202°C) as reported by the specialized technical literature.

A second sample of the solution (14.55 grs.), treated with zinc dust as above, was neutralized with alcoholic NaOH, at minus 5°C, and further reduced (NaBH₄) to dodecanediol-1:12. Upon acidification with HCl, extraction with ether and evaporation of the solvent, there were obtained 6.34 grs. of dodecanediol-1:12, whose identity and purity were shown by the melting point, found as 79.5°–80°C, that is very close to the value (79°–79.5°C) as shown by the technical literatures for this compound.

A further check of the composition and purity of the products which can be obtained, by reduction, from the ozonide as prepared according to this example, was made by treating a portion of dodecanediol-1:12, as obtained with the above method, with diazomethane, so as to esterify the possibly present organic acids and then carrying out a gaschromatographic analysis. It was ascertained that the compound had a purity of 98.7%, the impurities (1.3%) consisting of 12-hydroxydodecanoic acid.

EXAMPLE II

Ozonization of Cyclohexene in Cyclohexane and Acetic Acid

By utilizing the apparatus used for carrying out Example I, the reactor has been charged with 35 grs. rectified cyclohexene (boiling point 83°C), 560 grs. cyclohexane purified by treatment with conc. sulphuric acid and subsequent rectification, and 105 grs. glacial acetic acid. The treatment described in example I was effected at a temperature of 9°–10°C and by feeding the reactor with 4.2 grs. an hour of ozone in 60 liters of oxygen, 10 grs./h of cy-clohexene and 39.4 grs./h of acetic acid. The reaction went on under the conditions described above.

Upon effecting the check, also under the conditions and in the manner as described above, after a partial evaporation in a vacuo (due to the low boiling point of cyclohexene) the values were obtained of 3.86% active oxygen in the ozonide, corresponding to a concentration of the cyclohexene ozonide in acetic acid, of 31.4%. The yield, calculated as above, was 96.5% in terms of ozonide, with respect to the fed-in ozone.

To check the product, a sample (30 grs) of the solution was reduced with zinc dust according to the conditions of Example I and 8.2 grs. of adipic aldehyde were obtained, having a boiling point of 56°–58°C under an abs. pressure of 1.5 mms. of mercury. The aldehydic group percentage was 98.3 %. The dioxime had a melting point of 171°–172°C. The yield of adipic dialdehyde, as obtained from the thusly produced ozonide, was 97.6%.

EXAMPLE III

Ozonization of Cyclooctene in N-Heptane and Acetic Acid

By utilizing the reactor of Example I and the procedure substantially as described above, there were charged 50 grs. of cyclo-octene, containing 2.8% of cyclo-octane, 80 grs. of glacial acetic acid, and 570 grs. of n-heptane. By operating at a temperaure of 5°C, the reactor was fed with 4.3 grs. an hour of ozone (in 60 liters of oxygen), 10.9 grs. an hour of cyclo-octene and 27 grs. an hour of acetic acid.

The residue, treated as indicated in Example II, consisted of an acetic solution of the acetylated cyclo-octene ozonide and analyzed (the analysis being effected as in the preceding Examples) the following results:

| | | |
|---|---|---|
| Active oxygen | 4.13% | |
| Ozonide | 40.6% | |
| Yield | 97.8% | expressed as active oxygen with respect to the charged ozone |

To check it, a sample (50 grs.) of the solution was subjected to the above described reduction with zinc dust, the result being 18 grs. of suberic aldehyde. The percentage of aldehyde groups was 97.7%, the dioxime had melting point of 150°–151°C (literature: 152°C). Yield: 94.6% of suberic aldehyde with respect to the cyclo-octene ozonide.

EXAMPLE IV

Ozonization of Cyclohexene in N-Hexene and Ethyl Alcohol

By utilizing an apparatus as described with reference to FIG. 2, the respective reactor 110 was charged with 40.7 grs. of rectified cyclohexene, 50 grs. ethyl alcohol and 760 grs. of n-hexane. By exploiting the circumstance that the substances which are present are more volatile and less prone to crystallization, than they were in the preceding Examples, it was possible to operate at 0°C. The reaction was proceeded with by continuously feeding in 4.5 grs. an hour of ozone in 60 liters of oxygen, 8.8 grs an hour of cyclohexene and 30 grs. an hour of ethyl alcohol. The process went on as described above, the only difference being that the mixture was caused to circulate through the centrifugal extractor 114, the heavy phase being withdrawn through the respective outlet 142.

The heavy phase was evaporated in a vacuo at a temperature of 30°C until reaching about the 38% of its initial weight and had an active oxygen content of 8.8%, corresponding to a concentration of the cyclohexene ozonide derivative as high as 71.5%. By carrying out the analysis and checks as described above, the yield was 98.2% with respect to the charged ozone.

EXAMPLES FROM V TO XV

In order to complete the preceding particular Examples, the results will be summarized, in the following, of an additional series of examples of ozonization of cyclododecene, with different procedures and with the adoption of a large number of both binary and ternary mixtures of polar and nonpolar solvents. These results are reported in the following Table, in which the several mixtures of solvents are accompanied by the indication of their respective proportional quantities of the individual solvents, on a weight basis. The Examples from V to XI refer to procedures as set forth in Example I, with the adoption of an apparatus such as shown in FIG. 1, whereas the Example XII, XIII AND XIV, which involve the use of solvent mixtures in which the specific gravity differential is less pronounced, refer to tests effected with the use of an apparatus equipped with a centrifugal separator, according to the alternative embodiment of FIG. 2. All the tests have been carried out at the temperature of 6°C, with the following exceptions:

Example V : 15°C; Example VIII: 20°C; Example XIII: 10°C and Example XIV: minus 10°C. Examples VII and XI show that the use of ternary mixtures, also with the use of even small amounts of a second polar liquid (note the presence of 0.01 parts of water in Example VII) can be advantageous to the end of a further improvement in the selective yield.

Example XV is an Example given for comparison. By operating in a single solvent (acetic acid) the result is, in addition to an undesirably low selective yield, an ozonide which is neither pure nor structurally uniform, which is poorly suitable for an advantageous industrial application.

Furthermore, an open-chain olefin can be subjected to ozonization, such as propylene, butylene and others, thus obtaining the corresponding ozonide derivatives, as described hereinbefore, for example, the peroxide ozonide having the formula $-CH_2-C^+-OO^-$ and, in addition, an aldehydic compound having the formula $$-CH_2-\underset{H}{\overset{|}{C}} = O.$$

What is claimed is:

1. A method for the production of peroxide derivatives of ozonides, by ozonization of the corresponding olefins, comprising feeding into a confined environment defining a space having a first part and a second part, a composite solution comprising the olefin, a nonpolar solvent which is inert with respect to the olefin, and a polar solvent, capable of reactively dissolving the olefin when ozonized and of forming a peroxide derivative therewith, and simultaneously supplying a gas including ozone into said environment and causing such gas to flow solely through the first part of said space to promote ozonization of the olefin and form an ozonide which, while being reactively dissolved by said polar solvent, forms a heavy phase containing said peroxide derivative, and effecting transfer of said peroxide derivative from the part in which the ozonization takes place into said second part of said space from which it is withdrawn to avoid superoxidation and polymerization.

2. A method according to claim 1, wherein said nonpolar solvent exceeds in amount the amount of the so-

| Ex.No. | SOLVENT MIXTURES (parts by weight) | | ANALYSIS | | | |
|---|---|---|---|---|---|---|
| | | | $CHO(CH_2)_{10}-$ $-CHO$ | $CHO(CH_2)_{10}-$ $-COOH$ | $(CH_2)_{10}-$ $-(COOH)_2$ | Others |
| V | n-heptane | (9) | 97.3 | 2.7 | — | — |
| | acetic acid | (1) | | | | |
| VI | cyclohexane | (9) | | | | |
| | acetic acid | (0.95) | | | | |
| | acetic anhydride | (0.05) | 97.8 | 2.1 | — | 0.1 |
| VII | cyclohexane | (9) | | | | |
| | acetic acid | (0.99) | 98.1 | 1.9 | — | — |
| | water | (0.01) | | | | |
| VIII | cyclohexane | (9.5) | 96.5 | 3.3 | — | 0.2 |
| | acetic acid | (0.5) | | | | |
| IX | petroleum ether | (8.5) | | | | |
| | acetic acid | (1.5) | 97.9 | 2.1 | — | — |
| X | n-hexane | (9) | | | | |
| | acetic acid | (0.9) | 96.6 | 3.1 | 0.3 | — |
| | formic acid | (0.1) | | | | |
| XI | n-heptane | (8.3) | | | | |
| | acetic acid | (1.5) | 98.1 | 1.1 | 0.3 | 0.5 |
| | propionic acid | (0.2) | | | | |
| XII | cyclohexane | (9) | 96.5 | 3.5 | — | — |
| | ethanol | (1) | | | | |
| XIII | cyclohexane | (9) | 97.1 | 2.4 | — | 0.5 |
| | methanol | (1) | | | | |
| XIV | n-heptane | (8.5) | 97.5 | 2.1 | 0.3 | 0.1 |
| | ethanol | (1.5) | | | | |
| XV | acetic acid | | 60.0 | 36.0 | 1.3 | 2.7 |

It is possible to ozonize, subsequently to transpose to bifunctional compounds, also cyclo-olefins having more than one unsaturations. By so doing, one obtains derivatives of unsaturated ozonides, which are susceptible of being converted, upon transposition, into unsaturated aldehydic acids. For Example, from 1:5:9-cyclodecatriene there can be obtained, upon ozonization in the manner described above and subsequent transposition thereof, 12-oxo-dodecadien-carboxylic acid. This compound, when subjected to reductive amination, gives the saturated omega-aminoacid.

lution of the olefin in the environment, and said polar solvent is in an amount in excess of the solution of ozonide derivative formed in the environment.

3. The method defined in claim 1, wherein said gas comprises a mixture of ozone and oxygen and this mixture is supplied to said environment above said lower space and is caused to flow upwardly through said upper space.

4. A method according to claim 1, wherein the ozonides obtained from the starting olefins are transposed into acidic aldehydes.

5. A method according to claim 1, wherein the ozonization process is performed in a liquid environment which contains a mixture of polar solvents, which are partially dissolved in the nonpolar solvents.

6. A method according to claim 5, wherein the weight ratio of the polar solvent to the nonpolar solvent is between 1 to 5 and 1 to 20.

7. A method according to claim 1, wherein the ozonization process is carried out at a temperature between −20° and −10°C.

8. A method according to claim 1, wherein the ozone is brought into contact with the olefin solution, under the form of an ozone-laden gas stream, in which ozone is present in an amount between 0.3 grs. and 10 grs. per 100 liters of gaseous mixture.

9. A method according to claim 1, wherein the ozonization process is a continuous run process, and the olefin, the gas which contains ozone, and the polar solvent are fed in continuous form into the reaction environment to restore the amounts which have been absorbed by the removal of the reacted compounds and the respective solvent from the reaction environment.

10. A method according to claim 1, wherein the ozonization is carried out in a liquid phase and the polar solvent is selected from the group consisting of low molecular weight alcohols, formic acid, propionic acid, acetic acid, the anhydrides of said acids, and water, taken alone or in admixture with each other or with other polar solvents.

11. A method according to claim 1, wherein the ozonization is effected in a liquid phase, and the nonpolar solvent is inert towards the reaction products and is selected from the group consisting of petroleum ether, n-hexane, n-heptane, cyclohexane, and methylcyclohexane.

12. A method according to claim 1, wherein the olefin is a cycloolefin.

13. A method for producing peroxide-like derivatives of ozonides by ozonization of the corresponding olefins, comprising feeding into a reactor a quantity of the olefin which is to be ozonized, a nonpolar solvent which is inert to the olefin, and a polar solvent capable of reactively dissolving the ozonide which is formed by ozonization of the olefin, and simultaneously feeding into the reactor a gas, which contains ozone, at a point intermediate the top and bottom of the reactor so that the gas will rise in the reactor through the olefin and solvents but will not pass through the peroxide-like derivatives formed in the reaction, exhausting the gas from the top of the reactor, withdrawing the heavy peroxide-like derivatives from the bottom of the reactor, continuously feeding into the reactor olefin, and solvents to maintain the level of liquid in the reactor, and continuously supplying the ozone-containing gas to the reactor.

* * * * *